(12) United States Patent
Yamada et al.

(10) Patent No.: US 7,909,979 B2
(45) Date of Patent: Mar. 22, 2011

(54) WATER PHOTOLYSIS SYSTEM AND PROCESS

(75) Inventors: Yuka Yamada, Nara (JP); Masa-aki Suzuki, Osaka (JP); Nobuyasu Suzuki, Nara (JP); Hidehiro Sasaki, Neyagawa (JP); Yasunori Morinaga, Suita (JP)

(73) Assignee: Panasonic Corporation, Osaka (JP)

( * ) Notice: Subject to any disclaimer, the term of this patent is extended or adjusted under 35 U.S.C. 154(b) by 139 days.

(21) Appl. No.: 12/418,202

(22) Filed: Apr. 3, 2009

(65) Prior Publication Data

US 2009/0188783 A1 Jul. 30, 2009

Related U.S. Application Data

(60) Division of application No. 10/898,967, filed on Jul. 27, 2004, which is a continuation of application No. PCT/JP2004/003921, filed on Mar. 23, 2004.

(30) Foreign Application Priority Data

Mar. 26, 2003 (JP) ................................ 2003-085040
Oct. 15, 2003 (JP) ................................ 2003-354829

(51) Int. Cl.
*C25B 1/04* (2006.01)
*C25B 11/03* (2006.01)
*C25B 11/04* (2006.01)
*C25B 9/04* (2006.01)

(52) U.S. Cl. ......... 205/340; 204/248; 205/628; 205/630
(58) Field of Classification Search .................... 205/340
See application file for complete search history.

(56) References Cited

U.S. PATENT DOCUMENTS

| 3,306,705 A | | 2/1967 | Leineweber et al. | |
| 4,342,738 A | | 8/1982 | Burgund | |
| 4,352,722 A | * | 10/1982 | Ohkawa | 205/340 |
| 4,472,260 A | * | 9/1984 | Neefe | 204/278 |
| 4,476,105 A | * | 10/1984 | Greenbaum | 423/658.2 |

(Continued)

FOREIGN PATENT DOCUMENTS

EP  0 372 371  11/1989

(Continued)

OTHER PUBLICATIONS

International Search Report issued in International Patent Application No. PCT/JP2004/003921, dated Jul. 6, 2004.

(Continued)

*Primary Examiner* — Harry D Wilkins, III
(74) *Attorney, Agent, or Firm* — McDermott Will & Emery LLP

(57) ABSTRACT

The present invention provides a water photolysis system comprising: a casing 1 into which incident sunlight L can enter from the outside and a photolytic layer 5 which is disposed inside the casing 1; wherein the photolytic layer 5 has a light-transmissive porous material 51 and photocatalyst particles 52 supported thereon; a water layer 4 containing water in its liquid state is disposed below the photolytic layer 5 with a first space 6 disposed between the water layer and the photolytic layer; a sealed second space 7 is formed above the photolytic layer 5 in the casing 1; vapor generated from the water layer 4 is introduced into the photolytic layer 5 via the first space 6; and the vapor is decomposed into hydrogen and oxygen by the photocatalyst particles 52, which are excited by the sunlight L.

1 Claim, 3 Drawing Sheets

U.S. PATENT DOCUMENTS

| | | | |
|---|---|---|---|
| 4,522,695 A * | 6/1985 | Neefe | 204/266 |
| 4,650,554 A | 3/1987 | Gordon | |
| 4,889,604 A | 12/1989 | Khan et al. | |
| 4,966,812 A | 10/1990 | Ashley et al. | |
| 6,133,407 A | 10/2000 | Kaneshiro et al. | |
| 6,204,545 B1 | 3/2001 | Nakata | |

FOREIGN PATENT DOCUMENTS

| | | |
|---|---|---|
| JP | 51-83895 | 7/1976 |
| JP | 52-97376 | 8/1977 |
| JP | 57-191202 | 11/1982 |
| JP | 58-125602 | 7/1983 |
| JP | 2-107339 | 4/1990 |
| JP | 10-218601 | 8/1998 |
| JP | 10-277400 | 10/1998 |
| JP | 10-305274 | 11/1998 |
| JP | 2001-213608 | 8/2001 |

OTHER PUBLICATIONS

CRC Handbook of Chemistry and Physics, 87th ed.; CRC Press: Boca Raton, FL., 2006, pp. 14-19.

* cited by examiner

WATER PHOTOLYSIS SYSTEM AND PROCESS

RELATED APPLICATIONS

This application is a Divisional of U.S. application Ser. No. 10/898,967, filed Jul. 27, 2004, which is a Continuation of International Application No. PCT/JP2004/003921, filed on Mar. 23, 2004, which in turn claims the benefit of Japanese Application Nos. 2003-085040, filed Mar. 26, 2003 and 2003-354829, filed Oct. 15, 2003, the entire contents of each of which are hereby incorporated by reference.

TECHNICAL FIELD

The present invention relates to a photolysis system and process for decomposing water into hydrogen and oxygen through photocatalysis.

BACKGROUND OF THE INVENTION

Since the discovery of water photolysis using a semiconductor photoelectrode, i.e., the so-called Honda-Fujishima effect, much research on water decomposition using a photocatalyst has been conducted based on the idea that it may be an effective means for converting light into chemical energy. The following is known about the mechanism of water photolysis using a semiconductor photocatalyst. When an n-type semiconductor, for example, is used as a photocatalyst and light having energy greater than the band gap energy of the semiconductor is irradiated, electrons in the valence band are photo-excited into the conduction band to generate free electrons in the conduction band, and, in contrast, positive holes are generated in the valence band. A photocatalysis reaction then proceeds when a reduction reaction and an oxidation reaction are caused by the generated electrons and positive holes, respectively.

A semiconductor photocatalyst can cause water photolysis under conditions where the band width of the semiconductor is larger than the electrolytic potential (theoretical value 1.23 V) of water. In addition, the electrons in the conduction band must be able to reduce water and the positive holes in the valence band must be able to oxidize water. More specifically, the lower end of the conduction band must be located at the minus side with respect to the potential at which hydrogen is generated from the water, and the upper end of the valence band should be located at the plus side with respect to the oxygen generation potential.

As semiconductors which meet such conditions, titanium dioxide, strontium titanate, barium titanate, sodium titanate, cadmium sulfide, zirconium dioxide, iron oxide, etc., have been found. Moreover, it is known that the semiconductors that support a metal, such as platinum, palladium, rhodium, ruthenum, etc., as a promoter can be effectively used as a photocatalyst for water photolysis.

For example, reference No. 1 (Japanese Unexamined Patent Publication No. 11 (1999)-188269) and reference No. 2 (Japanese Unexamined Patent Publication No. 2000-126761) disclose examples using photocatalysts as mentioned above. These references disclose floating a porous material supporting a photocatalyst on the surface of a pond or the like, causing photocatalysis by irradiating the porous material with light, and thus purifying the water.

If sunlight can be used for water photolysis, the hydrogen and oxygen generated can be stored and used to obtain heat and electricity through reactions, when required. In other words, sunlight energy can be converted into chemical energy and stored, thus providing an extremely effective method of utilizing solar energy.

However, catalysts, in particular, metal catalysts, which actively generate hydrogen, also actively react hydrogen and oxygen, which is a problem because the water photolysis will thus cause a reverse reaction. For example, when a photocatalyst supporting platinum (Pt) is suspended in water and the suspension is irradiated with light, the hydrogen and oxygen which are generated through photolysis will mix before they leave the catalyst in the form of separate bubbles. The mixed hydrogen and oxygen thus contact and react with the Pt and return to water again, so only a small amount of hydrogen and oxygen can be obtained.

In order to solve this problem, reference No. 3 (Front page, Volume 33, No. 2, 45 to 58 pages, 1995), for example, discloses a process for increasing the contact between sunlight and a catalyst by dispersing powdery semiconductor photocatalysts in water and shaking the entire reaction apparatus. Reference No. 4 (Japanese Patent No. 3096728) discloses placing a photocatalyst on a water-absorbing material, and dampening the surface by impregnating the water-absorbing material with water, then irradiating the surface with sunlight from above.

However, since the process of reference No. 3 requires the use of mechanical energy, the amount of energy used to generate hydrogen is greater than the amount of energy that is obtained. In order to solve this problem, reference No. 4 has a structure such that water is supplied to the photocatalyst surface from the water-absorbing material and sunlight directly reaches the interface between the photocatalyst and water, which eliminates the need for mechanical mixture, such as shaking. However, in this structure, the photocatalyst disperses only on the surface of the water-absorbing material and the density is low, so it is difficult to obtain sufficient results.

There is also a problem in that sunlight has a wide energy distribution range, from the ultraviolet to the infrared spectral region, but only the energy from the ultraviolet to the visible light spectral region is used for water photolysis using a photocatalyst. Therefore, the solar energy in the infrared spectral region is not conventionally used. Accordingly, it cannot be said that the conventional photolysis system uses sunlight effectively.

The present invention was made in view of the above-described problems. It is an object of the present invention to provide a water photolysis system and process that can efficiently obtain hydrogen and oxygen by inhibiting reverse reaction, and, moreover, that can utilize solar energy effectively for promoting water photolysis.

DISCLOSURE OF THE INVENTION

The water photolysis system of the present invention is made to solve the above-described problems and comprises a casing into which incident light can enter from the outside and a photolytic layer which is disposed inside the casing; wherein the photolytic layer has a light-transmissive porous material and a photocatalyst supported on the porous material; a water layer containing water in its liquid state is placed below the photolytic layer via a first space; a sealed second space is formed above the photolytic layer in the casing. In this configuration, vapor generated from the water layer is introduced into the photolytic layer via the first space and the vapor is decomposed into hydrogen and oxygen by the photocatalyst, which is excited by the light.

The water photolysis process according to the present invention was made in order to solve the above-mentioned problems, and comprises placing a photolytic layer provided with a light-transmissive porous material, and a photocatalyst supported on the porous material on a water layer containing water in its liquid state at predetermined intervals, irradiating light onto the photolytic layer and decomposing vapor generated from the water layer into hydrogen and oxygen by the photocatalyst, which is excited by the incident light, when the vapor is introduced into the photolytic layer.

Figure 1:
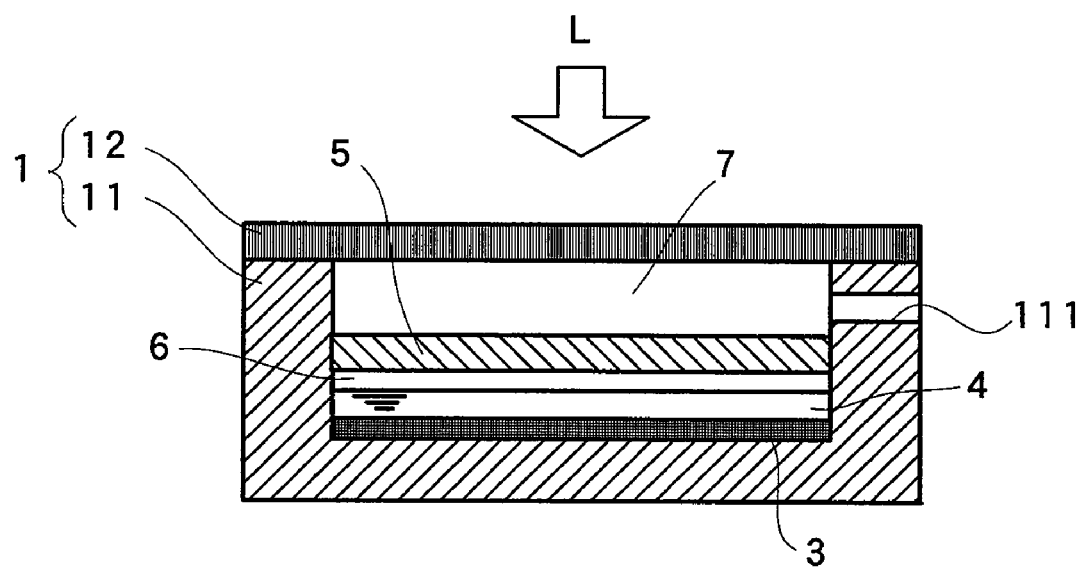
FIG. 1 is a cross sectional view schematically illustrating a configuration of a water photolysis system according to the first embodiment of the invention.

LIST OF REFERENCE NUMERALS SHOWN IN FIGURES 1. casing
11. body part
111. outlet port
115. inlet port
116. first outlet port
117. second outlet port
118. opening
12. light-transmission window
3. light-heat conversion layer
4. water layer
5. photolytic layer
51. porous material
52. photocatalyst particle
6. first space
7. second space
8. hydrogen separation membrane
9. water layer

BEST MODE FOR CARRYING OUT THE INVENTION

First Embodiment

Hereinafter, a water photolysis system according to the first embodiment of the present invention will be described with reference to the drawings. FIG. 1 is a cross sectional view schematically illustrating a configuration of a water photolysis system according to the first embodiment of the invention.

As shown in FIG. 1, this photolysis system has a casing 1 provided with a cup-like body part 11, the upper part of which is open, and a light-transmission window 12, which covers the upper opening of the body part 11, resulting in a sealed configuration as a whole. The light-transmission window 12 is composed of a light-transmissive material, such as quartz glass, and sunlight enters the inside of the casing 1 through the light-transmission window 12. A light-heat conversion layer 3, which is formed from a thin metal film, is disposed at the inner bottom surface of the casing 1, and a water layer 4 composed of purified water in its liquid state is formed on the light-heat conversion layer 3. A photolytic layer 5 for decomposing the water is disposed above the water layer 4, and a first space 6 is formed between the water layer 4 and the photolytic layer 5. A second sealed space 7 is formed between the photolytic layer 5 and the light-transmission window 12. A outlet port 111 which communicates with the second space 7 and the outside is formed at the side wall of the casing 1, and a gas separator (not shown) is attached to the outlet port 111. An inlet port (not shown) for introducing water in its liquid state into the water layer 4 within the casing can also be formed at the side wall of the casing.

Figure 2:
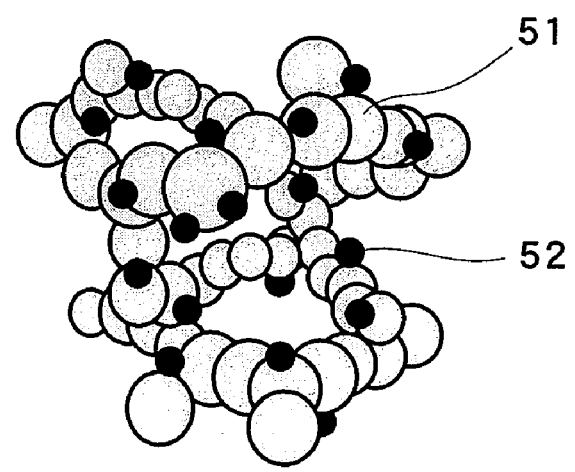
FIG. 2 is a schematic view illustrating a photolytic layer according to the first embodiment of the invention.

Next, the photolytic layer 5 will be described with reference to FIG. 2. FIG. 2 is a schematic view illustrating the structure of a photolytic layer. As shown in FIG. 2, the photolytic layer 5 has a structure such that photocatalyst particles 52 are dispersed on the surface of a gas-transmission membrane 51 having a porous structure. The gas-transmission membrane 51 should be transparent at least to the wavelength band in which photocatalysts are active, substantially insoluble and inert to water, and permeable to vapor. Examples of such a gas-transmission membrane include porous materials composed of organic or inorganic materials. Hereinafter, an inorganic porous oxide material which has a reticulated skeleton will be described as an example of this porous material.

A transparent metal oxide is used as the material for an inorganic acid porous material, and is preferably formed by a sol-gel method in order to obtain a reticulated skeleton. For example, silicone oxide (silica), aluminum oxide (alumina), magnesium oxide, titanium oxide, etc., and oxides containing multiple metals can be used. In particular, silica and alumina are preferable among these for use, since they allow a wet gel to be easily formed by the sol-gel method. Any material that can form a wet gel by a sol-gel reaction can be used as a starting material for these inorganic oxides. For example, inorganic starting materials such as sodium silicate and aluminum hydroxide; and organic-metal alkoxide of organic starting materials such as tetra-methoxysilane, tetra-ethoxysilane, aluminum isopropoxide, aluminium-sec-butoxide, etc., can be used. The sol-gel method is used for reacting these materials in a solvent with a catalyst, to form a wet gel.

Next, a process for producing a silica wet gel will be described in detail as an example. A process for synthesizing a starting material for silica can be used to form a wet gel through a sol-gel reaction in a solvent. In this process, a catalyst is used as required. During this formation process, silica particles are formed while the starting material is reacting in a solvent, and the particles gather to form a reticulated skeleton, resulting in a wet gel. More specifically, the compositions of the starting material, which consists of desired solid constituents, and solvent are determined. A catalyst, a viscosity regulator, etc., are added to the prepared solution as required, and the resultant is stirred, cast, spread, etc., to obtain the desired usage form. The resultant is left in this state for a predetermined period, whereby the solution gels to form a wet gel. Aging treatment may be performed, as required, to age the wet gel or control its porosity.

A wet gel is produced at near room temperature, which is the usual operation temperature, or may be produced at a temperature below the boiling point of its solvent, as required. The starting material for silica in this production process includes alkoxysilane compounds such as tetramethoxysilane, tetraethoxysilane, trimethoxymethylsilane, dimethoxydimethylsilane, etc., and their oligomers; water glass compounds, such as sodium silicate (soda silicate), potassium silicate, etc.; or colloidal silica, etc., which can be used singly or in combination. Any solvent that can dissolve the starting material to form a silica can be used, so that water and other commonly-used organic solvents, such as methanol, ethanol, propanol, acetone, toluene, hexane, etc., can be used singly or in combination. Usable catalysts include water; acids such as hydrochloric acid, sulfuric acid, acetic acid, etc.; bases such as ammonia, pyridine, sodium hydroxide, potassium hydroxide, etc. Usable viscosity regulators include ethylene glycol, glycerol, polyvinyl alcohol, silicone oil, etc., and are not limited thereto as long as a wet gel can be formed in the desired usage form.

Next, the obtained wet gel of inorganic oxides is dried, to produce a dried gel. Usable drying treatments include commonly-used drying processes such as natural drying, heat drying, ordinary drying under reduced pressure, supercritical drying, freeze drying, etc. In general, when the amount of solid constituents in a wet gel is reduced in order to increase the surface area of the dried gel and lower the density thereof, the strength of the gel decreases. In many cases, the gel shrinks when it is simply dried due to the stress that occurs when the solvent evaporates. Accordingly, supercritical drying or freeze drying is preferably used as the drying process so as to obtain a dried gel with excellent porosity from a wet gel, thereby preventing shrinkage of the gel, in other words, preventing an increase in density, when drying. Also in commonly-used drying processes that evaporate the solvent, gel shrinkage can be inhibited when drying by using a solvent with a high boiling point to lower the evaporation rate, or by controlling the evaporation temperature. Gel shrinkage at the timing of drying can be suppressed also by controlling the surface tension of the solid constituents of the wet gel by water-repellent treatment, etc.

With supercritical drying or freeze drying, the gas-liquid interface can be eliminated by changing the solvent phase from that of a liquid, thereby eliminating stress to the gel structure due to surface tension. Therefore, gel shrinkage can be avoided when drying, making these methods suitable for obtaining porous dried gel materials with low density. In particular, a dried gel obtained by supercritical drying is preferable for use in the present invention.

Wet gel solvents can be used in supercritical drying. It may also be preferred to replace the solvent with one that is easy to handle in supercritical drying, as required. Solvents for use in this replacement include alcohols, such as methanol, ethanol, and isopropyl alcohol; carbon dioxide; and water, each of which directly renders the solvent into a supercritical fluid. Alternatively, a commonly-used organic solvent which enables easy elution from these supercritical fluids, and is easy to handle can be used for this replacement. Such solvents include acetone, isoanyl acetate, hexane, etc.

Supercritical drying is carried out in a pressure vessel, such as an autoclave, and in the case of methanol for example, critical pressure is set to 8.09 Mpa and critical temperature is set to 239.4° C. or above, which are critical conditions for methanol. Drying is then carried out while releasing the pressure gradually at a fixed temperature. In the case of carbon dioxide, drying is performed at the critical pressure of 7.38 MPa and the critical temperature of 31.1° C. or above while releasing pressure from the supercritical condition at a fixed temperature, similar to the above procedure, to change the fluid into a gas state. In the case of water, drying is performed at the critical pressure of 22.04 MPa and critical temperature of 374.2° C. or above. Drying is performed for the period of time that is required to exchange the solvent in the wet gel one or more times by the supercritical fluid.

In order to dry a wet gel after it has been subjected to a water-repellent treatment, the surface treatment agent used for water-repellence is chemically reacted with the surface of the solid constituent within the solvent in a wet gel state. This chemical reaction reduces the surface tension generated inside the pores of the reticulated skeleton of the wet gel, thereby lowering the stress during drying, resulting in a dried gel in which shrinkage is suppressed during the commonly-used drying. The surface treatment agent includes halogen-based silane treatment agents, such as trimethylchlorsilane, dimethyldichlorsilane, methyltrichlorsilane, ethyltrichlorsilane, etc.; alkoxy-based silane treatment agents, such as trimethylmethoxysilane, trimethylethoxysilane, dimethyldimethoxysilane, methyltriethoxysilane, etc.; silicone-based silane treatment agents, such as hexamethyldisiloxane, dimethyl siloxane oligomer, etc.; amine-based silane treatment agents, such as hexamethyldisilazane, etc.; alcohol-based treatment agents, such as propylalcohol, butylalcohol, hexylalcohol, octanol, decanol, etc. The surface treatment agent is also not limited thereto. Any surface treatment agent can be used as long as the wet gel does not shrink and a dried gel can be obtained by the commonly-used drying process.

Since particles aggregate to form a reticulated skeleton, the inorganic oxide porous material obtained by the above process forms a pattern as illustrated in FIG. 2. When this porous material is observed with an electron microscope, etc., an aggregate of particles is seen, and the voids form a porous structure. The inorganic oxide porous material 51 thus produced is transparent to the wide wavelength band of sunlight and has the property of transmitting only a gas due to its water repellency.

In this case, the porosity of the porous material is preferably within the range of 50% or more to 98% or less. The reasons are as follows. When the porosity is 50% or less, the gas transmission amount tends to reduce, and when the porosity is 98% or more, the strength of the porous material is lowered, making it difficult to handle. However, desirable values with respect to this range might change depending on the characteristics of the inorganic oxide material, and are not limited. Here, porosity is the value obtained by subtracting from 100% the percentage value obtained by dividing the apparent density of a porous material by the true density of the material which forms the skeleton of the porous material. Density is a value measured by liquid displacement (the Archimedes method) or gas displacement.

The diameter of the pores in the inorganic oxide with a reticulated skeleton is 1 µm or less, preferably 100 nm or less, and more preferably several tens of nm or less. When the size is smaller or larger than this range, there is a tendency for the specific surface area of the porous material to become small and the quantity of supported photocatalyst particles to lower, resulting in reduced reaction efficiency. The preferable specific surface area is several tens of $m^2/g$ or more, and more preferably 100 $m^2/g$ or more. The pore size and specific surface area here are obtained by measuring the physical properties of the porous material with a mercury porosimeter, a nitrogen adsorption process, etc.

The photocatalyst particles 52 supported on such a porous material 51 will be described. Any photocatalyst particle that causes the above-mentioned photocatalysis can be used as the photocatalyst particles 52 in the present invention. For example, these include semiconductors, such as titanium dioxide, strontium titanate, barium titanate, sodium titanate, cadmium sulfide, zirconium dioxide, $\alpha—Fe_2O_3$, $K_4Nb_6O_{17}$, $Rb_4Nb_6O_{17}$, $K_2Rb_2Nb_6O_{17}$, and $Pb_{1-x}K_{2x}NbO_6$ ($0<x<1$), etc., and those in which a metal, such as platinum, palladium, rhodium and ruthenium, or $NiO_x$, $RuO_x$, $RhO_x$, etc., is supported as a promoter thereon. The average particle diameter is preferably in the range of 0.01 μm or more to 10 μm or less. The amount of prompter supported can be selected from the range of 0.1% by weight to 20% by weight based on the total amount of the semiconductor and the promoter. Photocatalysts can also be used in combination. Similarly, promoters can also be used in combination.

A method for supporting the photocatalyst particles 52 on the inorganic oxide porous material 51 will now be described. The photocatalyst particles 52 can be formed by using a colloidal support, by supporting a precursor such as a metal salt, followed by reduction using hydrogen or a reducing agent, or by sintering a precursor, such as a metal salt, etc. A catalyst or a precursor for a catalyst is supported by adding the photocatalyst particle when forming the inorganic oxide wet gel or by forming the photocatalyst particle on the surface of the inorganic oxide wet gel, etc. When the photocatalyst particle is supported as a precursor for a catalyst, the catalyzing process is performed after it is supported. Any of these methods can be selected depending on the material and structure to be employed. The above-described photolytic layer 5 is fixed to the inner wall surface of the casing 1, for example, via a gasket attached to the peripheral portion of the photolytic layer 5.

The operation of the water photolysis system configured as described above will now be described. First, when sunlight L strikes the inside of the casing 1 via the light-transmission window 12, light in the infrared spectral region (heat energy) among the incident solar energy passes through the photolytic layer 5, and strikes the water layer 4. A part of the heat energy is absorbed into the water layer 4, and the remainder passes through the water layer 4 and is absorbed into the light-heat conversion layer 3. In this way, the heat energy absorbed into the light-heat conversion layer 3 indirectly warms the water layer 4, and some of the warmed water vaporizes. In this process, the gas-transmission membrane 51 which embodies the photolytic layer 5 transmits only gas as mentioned above, so only vapor is introduced into the photolytic layer 5 since the water layer 4 and the photolytic layer 5 are spaced apart via the space 6.

Light (from the ultraviolet to the visible light spectral region) having higher energy than the band gap energy of the photocatalyst particles is absorbed into the photocatalyst particles 52 dispersed in the photolytic layer 5. In this process, when the vapor introduced into the photolytic layer 5 reaches the surface of the photocatalyst particles 52, the water photolysis reaction proceeds and hydrogen and oxygen are produced. The resulting hydrogen and oxygen pass through the photolytic layer 5 and diffuse into a gas phase, which inhibits reverse reaction on the surface of the photocatalyst particles and allows them to efficiently accumulate in the second space 7. In this way, when the pressure within the casing 1 increases, these gases, i.e., hydrogen and oxygen, are introduced into a gas separator via a outlet port 11 and separated for use according to their respective purposes.

The diffusion of the produced hydrogen and oxygen into the second space 7 can be accelerated, thus further inhibiting the reverse reaction when a reduced-pressure atmosphere is formed inside the casing 1. Alternatively, it is favorable to use an inert gas atmosphere, such as argon, for the gaseous phase inside the casing 1. In this case, an inlet port can be formed in the wall opposite to the outlet port 111, and the inert gas can be introduced therefrom.

As mentioned above, according to the present embodiment, vapor generated from the water layer 4 is photolyzed to produce hydrogen and oxygen. Gas diffusion can thus be used, which eliminates the necessity for mechanical energy, such as the water stirring described in the prior-art example. As a result, the energy efficiency can be improved.

A photolysis reaction is performed in the gas phase, and therefore the reverse reaction of the produced hydrogen and oxygen can be inhibited. With regard to this point, the photolysis system according to the present embodiment has a special configuration such that the first space 6 is formed between the water layer 4 and the photolytic layer 5, which further suppresses the reverse reaction further. More specifically, water molecules volatilized from the water layer 4 to become vapor pass through the first space 6, and enter the photolytic layer 14. As shown in the above-mentioned references 1 and 2, when the water layer and the porous photolytic layer are brought into contact with each other, water in its liquid state enters the pores by capillarity action, and the water in its liquid state and the photocatalyst tend to react. However, this would cause the hydrogen and oxygen that were produced by the incident sunlight to return to water again by reverse reaction, thus remarkably lowering the production efficiency. The present embodiment differs from the above-mentioned prior-art example in that the first space 6 is formed between the water layer 4 and the photolytic layer 5, thus preventing contact between the water layer 4 and the photolytic layer 5. Therefore, the water in its liquid state does not easily enter the photocatalytic layer 5, so only the water molecules which were volatilized from the water layer 4 and became vapor can enter the photolytic layer 5. As a result, the reverse reaction mentioned above is inhibited. Vapor has a higher level of energy than water in its liquid state and can react promptly with a photocatalyst, whereby hydrogen and oxygen are efficiently obtained.

The light-heat conversion layer 3 is formed underneath the water layer 4, and thus solar heat L in the infrared spectral region which passed through the water layer 4 is absorbed into the light-heat conversion layer 3. Vapor can be generated from the water layer 4 with this heat. Accordingly, the energy in the infrared spectral region which was not conventionally used can also be utilized, which further improves energy efficiency. Since catalytic activity increases at higher temperatures, this also has the effect of further promoting the photolysis reaction.

The following advantages also exist. In the present embodiment, sunlight L and vapor are introduced over the entire thickness direction of the photolytic layer 5, so the region where the photolysis reaction occurs is not limited to the interface between the photolytic layer 5 and the water layer 4 as in the prior-art example. Therefore, the photolysis reaction is promoted in accordance with the thickness of the photolytic layer 5.

Hydrogen and oxygen obtained as mentioned above may, for example, be used as an energy source supplied to a fuel cell.

Second Embodiment

Figure 3:
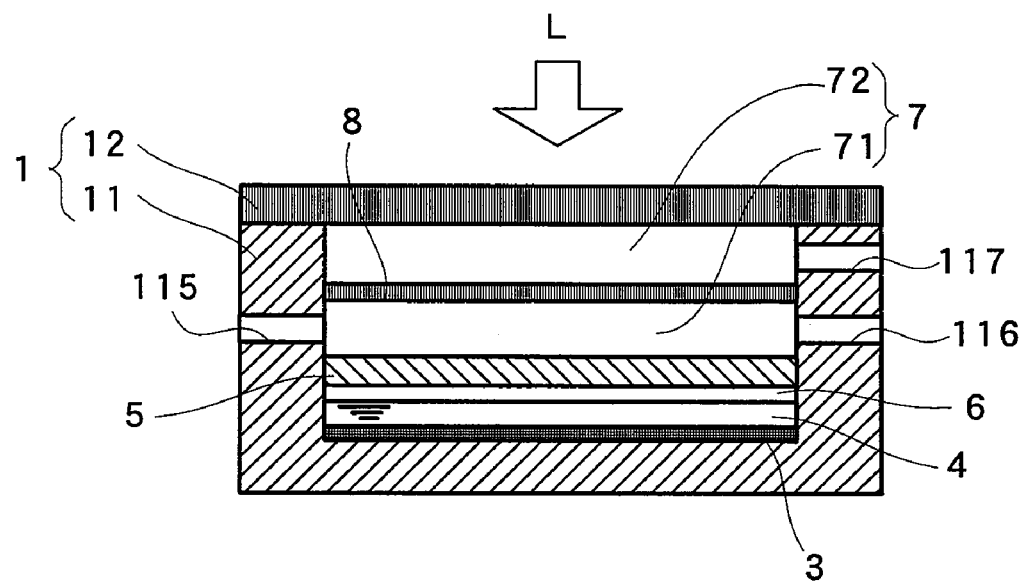
FIG. 3 is a cross sectional view schematically illustrating a configuration of a water photolysis system according to the second embodiment of the invention.

Hereinafter, the water photolysis system according to the second embodiment of the present invention will be described with reference to drawings. FIG. 3 is a cross sectional view schematically illustrating the configuration of the water photolysis system according to the present embodiment. The present embodiment is different from the first embodiment with respect to the second space and the configuration of the casing therearound. Other structures are the same as in the first embodiment and therefore the same reference numerals as those used in the first embodiment designate the same parts and their detailed descriptions are omitted.

As shown in FIG. 3, in the present embodiment, the second space 7 formed between the photolytic layer 5 and the light-transmission window 12 is separated into two upper and lower spaces via the hydrogen separation membrane 8. More specifically, a first gas accumulation part 71 is formed between the photolytic layer 5 and the hydrogen separation membrane 8, and a second gas accumulation part 72 is formed between the hydrogen separation membrane 8 and the light-transmission window 12. Three through-holes which communicate with the outside are formed in the walls of the casing 1. More specifically, an inlet port 115 and a first outlet port 116 are formed at opposing positions in the walls of the first gas accumulation part 71, and a second outlet port 117 is formed in the wall of the second gas accumulation part 72. The inlet port 115 and the first outlet port 116 are thus formed in the opposing wall surfaces. Any material that can transmit hydrogen can be used as a hydrogen separation membrane 8 without limitation. For example, a polyimide film (trade name "Kapton" (registered trademark), manufactured by DuPont-Toray Co., Ltd.), which is subjected to heat treatment at a temperature ranging from 600° C. or above to 1,000° C. or below can be used.

The operation of the water photolysis system configured as mentioned above will now be described. First, when sunlight L strikes the inside of the casing 1 via the light-transmission window 12, light in the infrared spectral region (heat energy) passes through the photolytic layer 5, and strikes the water layer 4 in the same way as in the first embodiment. The heat energy which passes through the water layer 4 and is absorbed into the light-heat conversion layer 3 warms the water layer 4, and some of the warmed water vaporizes. The resulting vapor passes through the first space 16 and enters the photolytic layer 5.

Light within the range of the ultraviolet to the visible light spectral region is absorbed into the photocatalyst particles 52 dispersed in the photolytic layer 5. In this process, when vapor introduced into the photolytic layer 5 reaches the surface of the photocatalyst particles 52, the water photolysis reaction proceeds and hydrogen and oxygen are produced. The resulting hydrogen and oxygen pass through the photolytic layer 5 and easily diffuse into a gas phase, which inhibits reverse reaction on the surface of the photocatalyst particle. The hydrogen and oxygen are thus efficiently accumulated in the first gas accumulation part 71. The hydrogen that accumulates in the first gas accumulation part 71 passes through the hydrogen separation membrane 8 and then accumulates in the second gas accumulation part 72. From there, the hydrogen is evacuated to the outside of the casing 1 through the second outlet port 117 and stored in a hydrogen storing unit (not shown). The oxygen, which does not pass through the hydrogen separation membrane 8, is evacuated from the first outlet port 116. It should be noted that gas evacuated from the first outlet port 116 can also be separated by the gas separator in the same way as in the first embodiment.

The diffusion of hydrogen into the gas accumulation part 72 can be accelerated by forming a reduced-pressure atmosphere inside the second gas accumulation part 72 by using a evacuation system connected to the second outlet port 117. As a result, reverse reaction can be further inhibited to allow more efficient separation/recovery of hydrogen alone. Alternatively, an inert gas, such as argon can be introduced from the inlet port 115 in the first accumulation part 71, to produce a pressure difference between the gas accumulation parts 71 and 72 such that the pressure of the first gas accumulation part 71 is higher than that of the second gas accumulation part 72. The pressure difference in this case is preferably within the range of about $1.3 \times 10^4$ Pa (about 100 Torr.) or more to about $1 \times 10^6$ Pa (about 7,600 Torr., i.e., about 10 atmospheres). This is because when the pressure difference is less than about $1.3 \times 10^4$ Pa, the pressure difference between the gas accumulation parts 71 and 72 is inadequate, and thus it is hard to efficiently separate/recover hydrogen. In contrast, when the pressure difference exceeds about $1 \times 10^6$ Pa, the pressure difference is too large, and thus the hydrogen separation membrane 8 may be torn.

The above configuration allows the following effects to be attained in addition to the same effects as in the first embodiment. The hydrogen separation membrane 8 is formed in the second space 7, so hydrogen separated by the photolytic layer 5 can be efficiently separated. Therefore, hydrogen can be obtained without using a gas separator, which reduces the device cost.

Water in its liquid state is supplied into the casing 1 to form the water layer in each of the above-mentioned embodiments, however, photolysis can also be performed using external water instead of supplying water to the casing 1. Such an embodiment will now be described.

Third Embodiment

Figure 4:
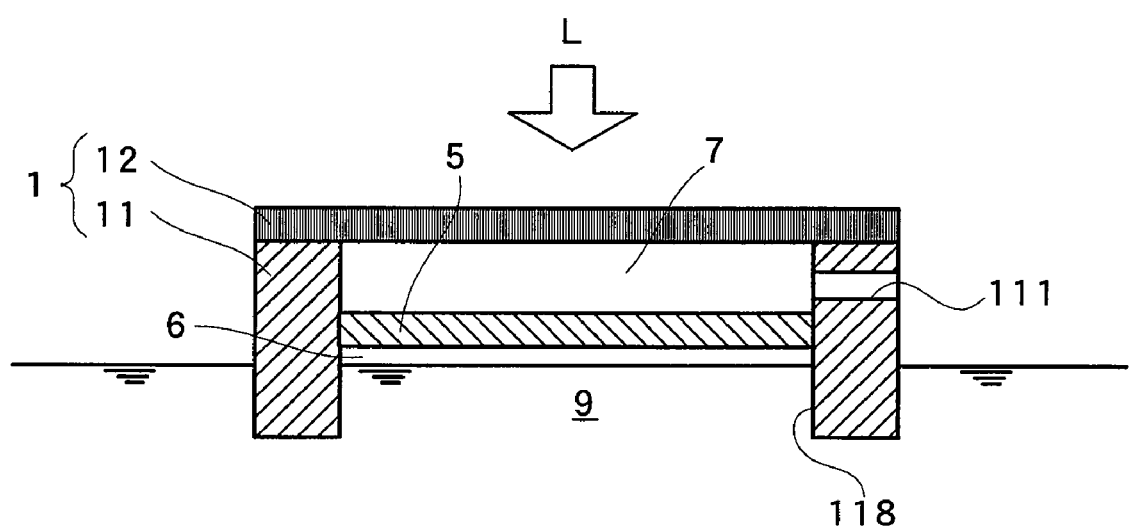
FIG. 4 is a cross sectional view schematically illustrating a configuration of a water photolysis system according to the third embodiment of the invention.

The third embodiment of the present invention will now be described with reference to drawings. FIG. 4 is a cross sectional view illustrating the water photolysis system according to the third embodiment. The present embodiment differs from each of the above-mentioned embodiments in the configuration of the casing. Other structures are the same as in the first embodiment.

As shown in FIG. 4, the water photolysis system according to the present embodiment is provided with an opening 118 formed at the bottom of the casing 1, and the entire body part 11 is shaped into a square tube. The casing 1 is placed in a water storing area, such as a water layer where water in its liquid state is stored, for example in an outdoor or indoor swimming pool (preferably an indoor swimming pool), a pond, a lake, the sea, etc., and is supported on the water layer 9 by a support device which is not shown. In detail, the casing 1 is floated on the water layer 9 with the lower part of the casing 1 inserted into the water layer 9. The casing 1 should be placed so that the surface of the water layer 9 and the photolytic layer 5 are spaced apart, and the space 6 (the first space) is formed therebetween.

The photolysis system configured as mentioned above carries out the same operation as in each of the above-mentioned embodiments. More specifically, water vaporizes from the water layer 9 by the incidence of sunlight L etc., and the resulting vapor enters the photolytic layer 5 via the first space 6. In this process, in the photolytic layer 5, the photocatalyst particles 52 are excited by the sunlight L and the introduced vapor is decomposed into hydrogen and oxygen.

As described above, according to the present embodiment, the following effects can be attained in addition to the same effects as in each above-mentioned embodiments. The above-mentioned photolysis system has an opening 118 at the bottom of the casing 1, with which it can introduce vapor into the casing 1. Therefore, unlike the systems of the first and second embodiments, it is not necessary to supply water into the casing 1 for storage, and water can be decomposed by simply placing the above-mentioned system in a place where water exists. Accordingly, the water supply is unnecessary, which simplifies the operating procedure.

In the present embodiment, the casing 1 is floated on the water layer 4. The present system, however, is not limited to this configuration, and may be configured as shown in FIG. 5.

Figure 5:
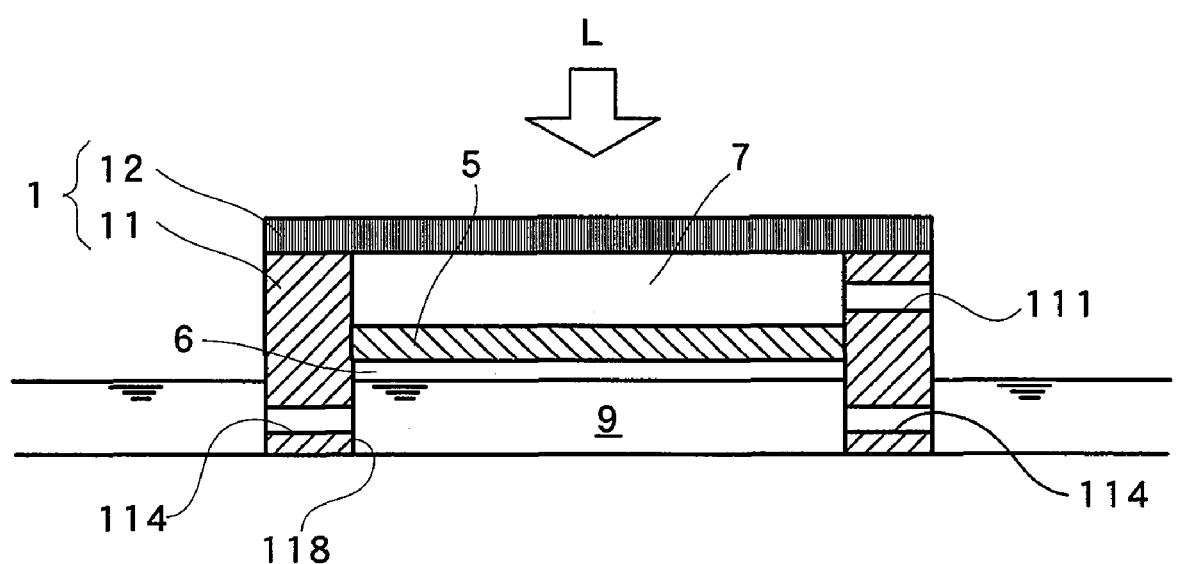
FIG. 5 is a cross sectional view schematically illustrating a configuration of another water photolysis system according to the third embodiment of the invention.

As shown in FIG. 5, this embodiment is intended for use in a water layer whose depth is comparatively shallow or in the above-mentioned swimming pool, and the casing 1 is placed so that the bottom part thereof contacts the bottom surface of the water layer 9. At this time, a space 6 (the first space) must be formed between the surface of the water layer 9 and the photolytic layer 5 to prevent contact between the water surface and the photolytic layer. For that purpose, the above-mentioned space 6 should be provided by placing the casing 1 in a location where the water is shallow or by adjusting the distance from the bottom part of the casing 1 to the photolytic layer 5. A water inlet port 114 is formed in the lower part of the side wall of the casing 1, and water is introduced into the inside of the casing from the water layer 9 via this inlet port 114. Even in the above-mentioned configuration, the same effect as each of the above-mentioned embodiments can be acquired, and moreover, placement of the casing 1 can be facilitated.

In the example shown in FIG. 5, the opening 118 is formed in the bottom part of the casing 1, however a casing whose bottom part is not open, as shown in FIG. 1, can also be used as long as an inlet port is formed to introduce water into the inside of the casing from the water layer 9.

Several embodiments of the present invention are described above; however, the present invention is not limited to these embodiments and various modifications can be made as long as they do not depart from the scope of the invention. For example, a porous material whose configuration is not the same as that in the first embodiment can be used in the invention. For example, a porous glass, a sintered article of inorganic oxide particles, a binder, etc., can be used. In these cases, the configuration of the porous material is different from that described in the first embodiment, and therefore the porosity and the pore size are not limited to the preferable range specified for the configuration in the first embodiment. A light-heat conversion layer 3 composed of a metal thin film is formed at the bottom surface of the water layer 4 in the first and second embodiments, but this is not limited thereto. As long as it contacts the water layer 4, any material that easily absorbs heat energy, for example, a black board or the like, can be used for the light-heat conversion layer 3. The light-heat conversion layer 3 is also not always necessary. For example, when the photolysis system is located at a roof into which heat is absorbed, the water layer can be warmed by the heat transmitted from the roof, i.e., external heat. In such a case, it is not necessary to provide a light-heat conversion layer. When sunlight is strong, the water layer can be warmed and vapor can be generated by sunlight alone, which eliminates the need for a light-heat conversion layer.

In each of the above-described embodiments, purified water is used for the water layer, however, in addition to purified water, aqueous solutions such as a $NaHCO_3$ solution, $Na_2SO_4$ solution, NaOH solution, etc., or sea water can be used for photolysis.

The casing 1 is not limited to the above-mentioned configuration, and may be configured without any light-transmission window 12 by constructing the whole casing 1 out of a light-transmissive material, for example, a transparent member. Either a colored and transparent material or a colorless and transparent material can be used, while a colorless and transparent material is preferred from the standpoint of good light transmission.

EXAMPLES

Hereinafter, examples of the water photolysis system according to the present invention will be shown, but the scope of the present invention is not limited thereto.

Example 1

$TiO_2$ photocatalyst particles supporting 1.0% by weight of $RuO_2$ as a promoter were dispersed onto a silica porous material, to produce a photolytic layer. The photocatalyst particles were produced as follows. First, 50 ml of a ruthenium chloride aqueous solution was added to 2.0 g of titanium dioxide and the solution was dried by evaporation. Thereafter, the resulting material was further dried at 110° C. and the dry substance produced was heated at 400° C. in air for 8 hours, yielding 1.0% by weight of powdery $RuO_2/TiO_2$. The average particle diameter was about 0.5 μm. Next, the obtained photocatalyst particles were suspended in a liquid starting material containing silica prepared from tetramethoxysilane, ethanol and an ammonia aqueous solution (decinormal) with a molar ratio of 1 to 3 to 4, and the resultant suspension was poured into a container, gelatinized and solidified to obtain a complex wet gel layer. The solvent in the wet gel was then replaced with acetone, and the resultant was dried by a super-critical drying process, to obtain a dry gel. The supercritical drying was conducted using carbon dioxide as the drying medium at a pressure of 12 MPa and a temperature of 50° C. After 4 hours of drying, the pressure was gradually released to the level of atmospheric pressure, and then the temperature was lowered. The above process yielded a porous silica material (with an average film thickness of approximately 0.5 mm) in which photocatalyst particles were dispersed. Approximately 0.23 mg/cm$^3$ of photocatalyst particles was used for support.

The photolytic layer produced as described above was attached to the photolysis system as shown in FIG. 1 and a gas chromatograph was connected to the outlet port. Subsequently, 50 ml of purified water was supplied as a water layer into the casing, and the inside of the casing was evacuated to 0.133 Pa (approximately $10^{-3}$ Torr) with a rotary pump, and $1.3 \times 10^4$ Pa (approximately 100 Torr) of argon gas was introduced. Sunlight was supplied from above the system and the quantity of produced hydrogen was measured by the gas chromatograph. As a result, the hydrogen production amount was 210 μm/kW·h calculated as a unit of solar energy.

For comparison, the photolytic layer was removed from the above-described system, and replaced with a system in which photocatalyst particles were dispersed in purified water. $1.3 \times 10^4$ Pa (approximately 100 Torr) of argon gas was introduced after evacuation, and sunlight was supplied in the same way as described above. As a result, the hydrogen amount produced was 20 μmol/kW·h.

Example 2

The photolytic layer was produced in the same manner as in Example 1. In other words, $TiO_2$ photocatalyst particles (with an average particle diameter of about 0.5 μm) supporting 1.0% by weight of $RuO_2$ as a promoter were dispersed onto a porous silica material (with an average film thickness of 0.5 mm), to produce a photolytic layer. The photolytic layer was attached to the system as shown in FIG. 3. A $NaHCO_3$ aqueous solution (0.1 mol) was used as a water layer. Subsequently, the inside of the casing was evacuated with a rotary pump, $1.3 \times 10^4$ Pa (approximately 100 Torr) of argon gas was introduced, and sunlight was supplied. The quantity of hydrogen separated/recovered by the hydrogen separation membrane, i.e., the amount of hydrogen evacuated from the second outlet port, was measured. As a result, the hydrogen production amount was 190 μm/kW·h calculated as a unit of solar energy. The recovered gas was analyzed by a gas chromatograph, which showed that hydrogen with a high level of purity of 95% or more was obtained.

For comparison, the photolytic layer was removed from the above-described system, and replaced with a material in which photocatalyst particles were dispersed in a $NaHCO_3$ aqueous solution. $1.3 \times 10^4$ Pa (approximately 100 Torr) of argon gas was introduced after evacuation, and sunlight was supplied in the same way as described above. As a result, the hydrogen amount produced was 30 μmol/kW·h.

The result of each example above verified that the conventional process exhibited a low production efficiency for hydrogen and oxygen since the hydrogen and oxygen produced by the incident sunlight returned to water again by reverse reaction. In contrast, hydrogen and oxygen could be produced efficiently by the present invention. Example 2 verified that hydrogen could be independently and efficiently separated, enabling the recovery of high-purity hydrogen.

INDUSTRIAL APPLICABILITY

The invention provides a water photolysis system that can efficiently obtain hydrogen and oxygen by effectively utilizing solar energy to promote a water photolysis reaction, and inhibiting reverse reaction.

The invention claimed is:

1. A process for photolyzing water comprising the steps of:
   placing a photolytic layer provided with a light-transmissive porous material and a photocatalyst supported on the porous material on a water layer containing water in its liquid state with a first space layer filled with air therebetween;
   shining light onto the photolytic layer; and
   separating vapor generated from the water layer into hydrogen and oxygen by the photocatalyst, which is excited by the incident light, when the vapor is introduced to the photolytic layer via the first space layer,
   wherein the porous material has a 3-dimensional reticulated skeleton and supports photocatalyst particles, and
   wherein the porous material surface is water-repellent.

* * * * *